United States Patent [19]
Thornton

[11] Patent Number: 5,793,291
[45] Date of Patent: Aug. 11, 1998

[54] CHILD ALERT SYSTEM FOR AUTOMOBILES

[76] Inventor: Carolyn M. Thornton, 2008 Eastview Ave., Louisville, Ky. 40205

[21] Appl. No.: 645,597

[22] Filed: May 13, 1996

[51] Int. Cl.⁶ .................................................. G08B 23/00
[52] U.S. Cl. .................. 340/573; 340/457; 340/425.5; 340/584; 340/449
[58] Field of Search .................................. 340/426, 429, 340/309.15, 457, 573, 584, 438, 449, 425.5, 666, 667, 522, 521; 236/566, 49.3

[56] References Cited

U.S. PATENT DOCUMENTS

| | | | |
|---|---|---|---|
| 3,441,103 | 4/1969 | Lymar | 180/82 |
| 4,092,633 | 5/1978 | Fletcher et al. | 340/500 |
| 4,177,460 | 12/1979 | Hoinski et al. | 340/576 |
| 4,278,970 | 7/1981 | Streezyn et al. | 340/635 |
| 4,278,971 | 7/1981 | Yasui et al. | 340/635 |
| 4,346,371 | 8/1982 | Ida | 340/635 |
| 4,474,185 | 10/1984 | Diamond | 128/722 |
| 4,524,349 | 6/1985 | Hyatt | 340/500 |
| 4,528,553 | 7/1985 | Hastings et al. | 340/500 |
| 4,760,379 | 7/1988 | De Phillipo et al. | 340/507 |
| 4,812,819 | 3/1989 | Corsberg | 340/500 |
| 4,831,361 | 5/1989 | Kimura | 340/500 |
| 5,054,686 | 10/1991 | Chuang | 236/49.3 |
| 5,218,339 | 6/1993 | Schrumpf et al. | 340/500 |
| 5,260,684 | 11/1993 | Metzmaker | 340/667 |
| 5,319,350 | 6/1994 | DeMarco et al. | 340/426 |
| 5,363,088 | 11/1994 | Schweitzer, Jr. | 340/635 |
| 5,510,765 | 4/1996 | Madau | 340/429 |
| 5,530,419 | 6/1996 | Ross et al. | 340/426 |
| 5,598,141 | 1/1997 | Grasmann et al. | 340/566 |

Primary Examiner—Jeffery A. Hofsass
Assistant Examiner—Sihong Huang
Attorney, Agent, or Firm—Armstrong, Teasdale, Schlafly & Davis

[57] ABSTRACT

The present invention, in one form, is an alarm system for detecting the presence of a person locked in a parked automobile. The alarm system includes a motion detector and a temperature detecting element coupled to a NOR gate. The motion detector transmits a low signal to the NOR gate once it detects motion within the interior of the automobile. The temperature detecting element transmits a low signal to the NOR gate if the temperature in the automobile exceeds a pre-determined extreme temperature. The NOR gate, upon receiving low signals from both the temperature detecting element and the motion detector, transmits an alarm signal.

13 Claims, 1 Drawing Sheet

CHILD ALERT SYSTEM FOR AUTOMOBILES

FIELD OF THE INVENTION

This invention relates generally to alarm systems and, more particularly, to motion detector alarm systems implemented in connection with automobiles.

BACKGROUND OF THE INVENTION

Automobile operators sometimes park their automobiles and inadvertently leave their pets inside the automobile, particularly in the back seat. Similarly, some automobile owners have been known to inadvertently lock their children in a parked automobile. If the pet or child is trapped in the automobile for an extended period of time, or during extreme temperatures, the pet or child typically suffers adverse health effects. In at least one instance, a child inadvertently trapped in a parked automobile has died.

At least one automobile alarm system has been developed to protect an automobile from vandalism and burglary. For example, at least one known alarm system has been designed to sound an alarm when a locked automobile door is opened without a key. Similarly, at least one known alarm system has been designed to sound an alarm upon physical contact with the exterior of a locked automobile. Such alarms, while substantially preventing an automobile from vandalism and burglary, do not detect the presence of a person or animal confined within a locked automobile.

To increase the safety of a child within a car, safety devices such as car seats have been developed. However, each of the known safety devices is designed to increase a child's safety while the automobile is moving, i.e., during automobile operation. Such devices do not prevent a child from inadvertently being locked in a parked automobile.

It would be desirable to provide an apparatus for detecting the presence of a person or animal within a parked automobile. It also would be desirable to provide such an apparatus that is substantially simple to fabricate and install in an automobile.

SUMMARY OF THE INVENTION

These and other objects may be attained with an alarm system which, in accordance with one embodiment, includes a motion detecting element for detecting motion of a child or animal confined within a parked automobile. Particularly, and in accordance with one embodiment of the present invention, the alarm system is coupled to an automobile and includes a motion detector, a temperature detecting element, and an alarm element. The motion detector is coupled to a first input of the alarm element. The temperature detecting element includes a normally open switch and is electrically coupled to a second input of the alarm element. The alarm element is coupled to the automobile horn and is configured to activate, e.g., sound, the automobile horn.

In operation, the alarm system is energized, e.g., turned on, when the automobile engine is off. The temperature detecting element detects the temperature of the interior of the automobile and compares the detected temperature to a pre-determined extreme temperature. If the detected temperature is greater than a maximum temperature and less than a minimum temperature, the temperature detecting element transmits an extreme temperature signal to the alarm element. The motion detector detects motion within the parked automobile and transmits a motion signal to the alarm element once motion is detected. Upon receiving both an extreme temperature signal and a motion signal, the alarm element transmits an alarm signal, and the alarm signal activates the automobile horn.

The alarm system described above is believed to detect the presence of a person or animal within a parked automobile. Such assembly also is believed to be substantially simple to fabricate and install in an automobile.

DETAILED DESCRIPTION OF THE DRAWINGS

Figure 1:
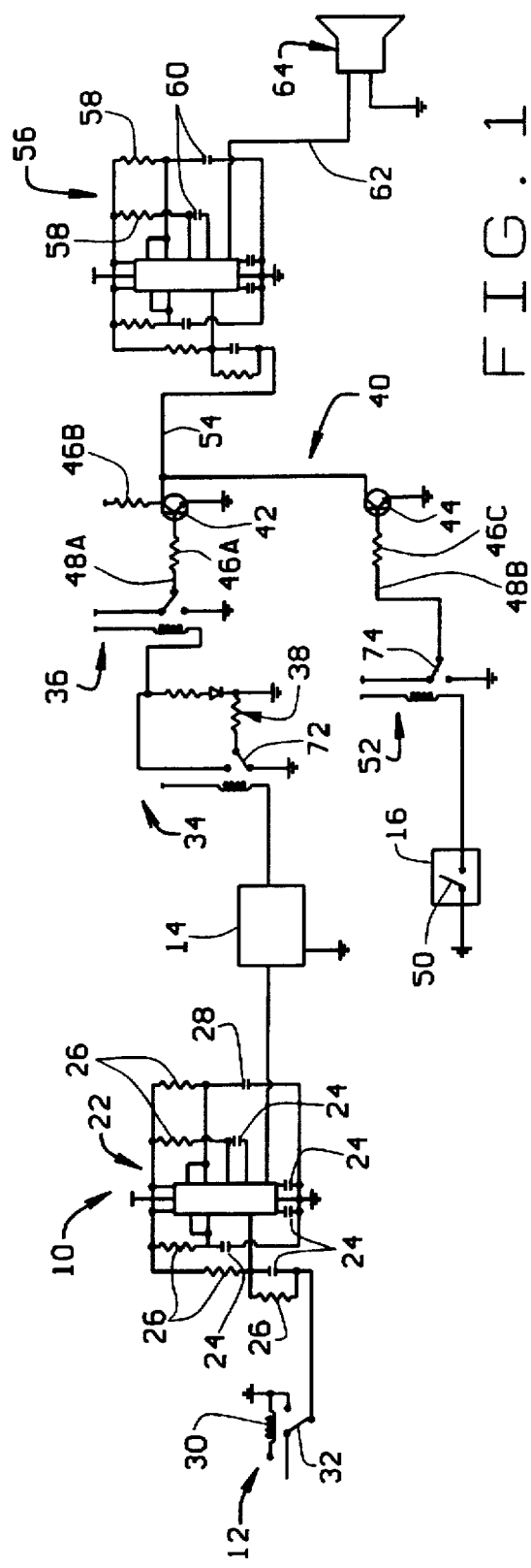
FIG. 1 is a schematic illustration of an alarm system in accordance with one embodiment of the present invention coupled to an automobile accessory switch.

FIG. 1 is a schematic illustration of an alarm system 10 in accordance with one embodiment of the present invention coupled to an automobile accessory switch 12. Alarm system 10 includes a motion detecting element 14, a temperature detecting element 16 and an alarm element 18. A first relay 20 and a first timing circuit 22 are connected in electrical series circuit between accessory switch 12 and motion detecting element 14.

First timing circuit 22 is a cascading, or sequential, timer and includes a first timer portion and a second timer portion (not shown). Cascading timers are well known and may, for example, be implemented in connection with a 556 chip. As a specific example, first timing circuit 22 includes several capacitors 24 and resistors 26. Capacitors 24 supply capacitance to first timing circuit 22, and enable first timing circuit 22 to both store energy and release stored energy. Each capacitor 24 typically includes two conductors 28 separated by an insulating material, and energy is stored as electrostatic energy between each two conductors 28. Resistors 26 add resistance to first timing circuit 22 and are constructed of low-conductance materials, such as powdered carbon. Resistors 26 and capacitors 24 provide a first timing circuit delay which is directly related to a ratio between capacitors 24 and resistors 26.

First relay 20 is electrically coupled to an alarm power source, e.g., a twelve volt power supply, and facilitates powering, or energizing, alarm system 10. Particularly, first relay 20 facilitates transmitting power from the power source to alarm system 10 when the automobile engine is off. First relay 20 is configured so that when the automobile is powered, i.e., when accessory switch 12 is in an on position, first relay 20 does not transmit power between the power supply and alarm system 10. However, first relay 20 also is configured so that when accessory switch 12 is in an off position, first relay 20 does transmit power between the power supply and alarm system 10.

Relay 20 may be a well known relay and include a magnetic coil 30 which is charged when voltage is applied across coil 30. When coil 30 is charged, it becomes substantially magnetic and closes a switch 32. When the voltage is dropped, coil 30 substantially discharges and loses its magnetism, thus causing switch 32 to open, but closing another switch, e.g., accessory switch 12. The relay typically also includes two pins. One pin normally is open when the relay is not charged, and the other pin is normally closed when the relay is not charged. Relays are well known.

Motion detecting element 14, for example, may be a motion detector configured to transmit an electrical signal upon detecting motion. Particularly, the motion detector is configured to detect motion, and to transmit a signal after detecting such motion. Motion detectors are well known.

Motion detecting element 14 is electrically coupled to alarm element 18, and is configured to transmit a motion signal to alarm element 18. Two relays 34 and 36 and a latch 38 are positioned between motion detecting element 14 and alarm element 18. Relays 34 and 36 and latch 38 are coupled to the power supply and cooperate to substantially ensure that the motion signal is either a high signal, e.g., five volts, or a low signal, e.g., zero volts, and not a haning, or intermediate, signal. Relays and latches are well known.

Alarm element 18 includes a NOR gate 40, which includes two transistors 42 and 44 and three resistors 46A, 46B, and 46C. NOR gate 40 includes two input portions 48A and 48B, and motion detecting element 14 is electrically coupled to input portion 48A.

Temperature detecting element 16 includes a normally open switch 50, and is configured to detect a temperature within the automobile and compare the detected temperature to an extreme temperature. NORmally open switch 50 is movable between an open position, as shown in FIG. 1, and a closed position. Temperature detecting element 16 also is configured to close normally open switch 52 if the detected temperature does not compare favorably with the extreme temperature. For example, if the detected temperature meets or exceeds a maximum temperature, e.g., one hundred degrees fahrenheit, then normally open switch 50 is closed and temperature detecting element 16 transmits an extreme temperature signal to second input portion 48B of NOR gate 40. Similarly, if the detected temperature is less than or equal to a minimum temperature, e.g., zero degrees fahrenheit, then normally open switch 50 is closed and temperature detecting element 16 transmits an extreme temperature signal to second input portion 48B of NOR gate 40.

Relay 52 is coupled in electrical series circuit between temperature detecting element 16 and alarm element 18. Relay 52 substantially ensures that NOR gate input portion 48B receives either high signal or low signal, and not a haning signal. Particularly, relay 52 substantially ensures NOR gate input portion 48B receives a high signal when normally open switch 50 is in the open position, and NOR gate input portion 48B receives a low signal when normally open switch 50 is in the closed position.

NOR gate 40 includes an output portion 54 which is electrically coupled to a second timing circuit 56. Second timing circuit 56 includes several resistors 58 and capacitors 60, and may be constructed in the same manner as first timing circuit 22, i.e., on a 556 chip. However, second timing circuit 56 is constructed to provide a second timing circuit delay which is less than the first timing circuit delay. An output 62 of second timing circuit 56 is coupled to an automobile horn 64, and is configured to activate, i.e., sound, horn 64.

In operation, an automobile operator turns off the automobile, and thus also turns off accessory switch 10. When accessory switch 10 is turned off, accessory switch 12 transmits, and first relay 20 receives, a low signal. First relay 20, upon receiving the low signal, closes a switch (not shown) between the system power source and first timing circuit 22, thus powering alarm system 10.

Figure 2:
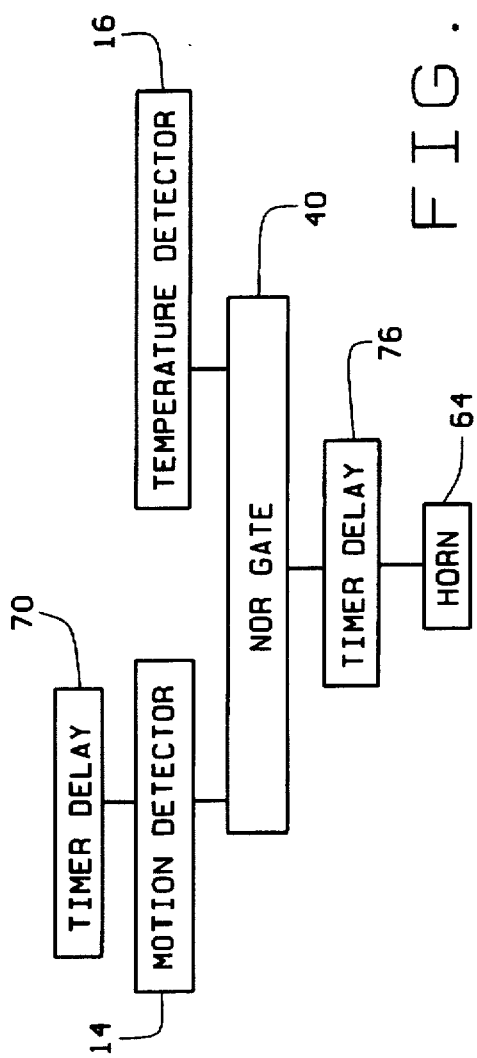
FIG. 2 is flow chart illustration of the operation of the alarm system shown in FIG. 1.

Referring to FIG. 2, alarm system 10 is set, i.e., ready for operation, after a first timing circuit delay 70. Particularly, when alarm system 10 is powered, first timing circuit 22 delays readying alarm system 10 for period of time so that, for example, the operator may exit the automobile, shut the automobile doors and lock the automobile doors without setting off the alarm. More specifically, the low signal transmitted from accessory switch 12 activates the first timer portion of first timing circuit 22, and the first timer portion transmits a high output signal for a first period of time. During the first period of time, the second timer portion of first timing circuit 22 transmits a low output signal.

After the first period of time, the first timer portion transmits a low output signal, and the second timer portion transmits a high output signal to motion detector 14. The high output signal energizes, e.g., sets, motion detector 14.

If energized motion detector 14 detects motion in the automobile, motion detector 14 transmits a motion signal and closes switch 72 (FIG. 1) to grounded relay 34 (FIG. 1). Grounded relay 34 causes latch 38 and relay 36 to cooperate to transmit a low signal to NOR gate 40.

If temperature detecting element 16 detects an extreme temperature, normally open switch 50 (FIG. 1) closes and temperature detecting element 16 transmits an extreme temperature signal to relay 52 (FIG. 1). Upon receiving such signal, relay 52 closes switch 74 (FIG. 1) and transmits a low signal to NOR gate 40.

If NOR gate 40 receives a low signal from both temperature detecting element 16 and motion detector 14, NOR gate 40 transmits a high signal to second timing circuit 56 (FIG. 1). Second timing circuit 56, after a second timing circuit delay 76, then transmits a signal to automobile horn 64 and activates horn 64.

Timing circuits, capacitors, relays and NOR gates are well known. Similarly, motion detectors and temperature detectors are well known.

The above-described alarm system sounds an automobile horn if a person or animal moves in the automobile while the temperature is extreme. In addition, such system may be fabricated with known components, and is believed to be substantially easy to install in an automobile. However, the alarm system described above is exemplary, and various modifications are possible. For example, temperature detecting element 16 may be disengaged so that alarm system 10 activates automobile horn 64 when motion is detected within the parked automobile, regardless of the actual temperature within the car.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, extreme temperatures of 100 degrees fahrenheit and 0 degrees fahrenheit were described above. Other extreme temperatures are possible. Accordingly, the spirit and scope of the invention are to be limited only by the terms of the appended claims.

I claim:

1. A method of warning of a person trapped in an automobile, said method comprising the steps of:

detecting motion within the interior of the automobile;

determining an actual temperature within the interior of the automobile;

comparing the determined actual temperature to an extreme temperature; and activating an alarm to produce an alarm signal if motion is detected within the interior of the automobile and the actual temperature is greater than the extreme temperature.

2. A method in accordance with claim 1 wherein the extreme temperature is approximately about 100 degrees fahrenheit.

3. A method in accordance with claim 1 wherein the automobile includes a horn, and wherein activating the alarm comprises the step of transmitting an alarm signal to the horn.

4. An alarm system for warning of a person trapped in an automobile, said alarm system comprising:

a motion detecting element detecting motion within the interior of the automobile;

a temperature detecting element detecting an actual temperature within the interior of the automobile; and an alarm element having a motion input portion and a temperature input portion, said motion detecting element electrically coupled to said alarm element motion input portion, said temperature detecting element electrically coupled to said alarm element temperature input portion, said alarm element configured to transmit an alarm signal when said motion detecting element detects motion and said temperature detecting element detects an extreme temperature.

5. An alarm system in accordance with claim 4 wherein said alarm element comprises an NOR gate.

6. An alarm system in accordance with claim 4 wherein said automobile includes a horn, and wherein said alarm element comprises an output coupled to the horn.

7. An alarm system in accordance with claim 4 further comprising a relay coupled between said temperature detecting element and said alarm element.

8. An alarm system in accordance with claim 4 wherein said alarm element further comprises an output portion, and wherein said alarm system further comprises a timing circuit coupled to said output portion of said alarm element.

9. An alarm system in accordance with claim 4 wherein said temperature detecting element comprises a normally open switch.

10. An alarm system in accordance with claim 4 wherein the automobile includes an accessory switch, and said motion detecting element is coupled to the accessory switch.

11. An alarm system in accordance with claim 10 further comprising a timing circuit coupled in electrical series circuit between the accessory switch and said motion detecting element.

12. A method of warning of a person trapped in an automobile, said method comprising the steps of:

detecting motion within the interior of the automobile;

determining an actual temperature within the interior of the automobile;

comparing the determined actual temperature to an extreme temperature; and activating an alarm to produce an alarm signal if motion is detected within the interior of the automobile and the actual temperature is less than the extreme temperature.

13. A method in accordance with claim 12 wherein the extreme temperature is approximately about 0 degrees fahrenheit.

* * * * *